No. 829,379. PATENTED AUG. 28, 1906.
J. W., F. T & M. BAILEY.
APPARATUS FOR MANUFACTURING CORRODING GAS.
APPLICATION FILED OCT. 18, 1900.
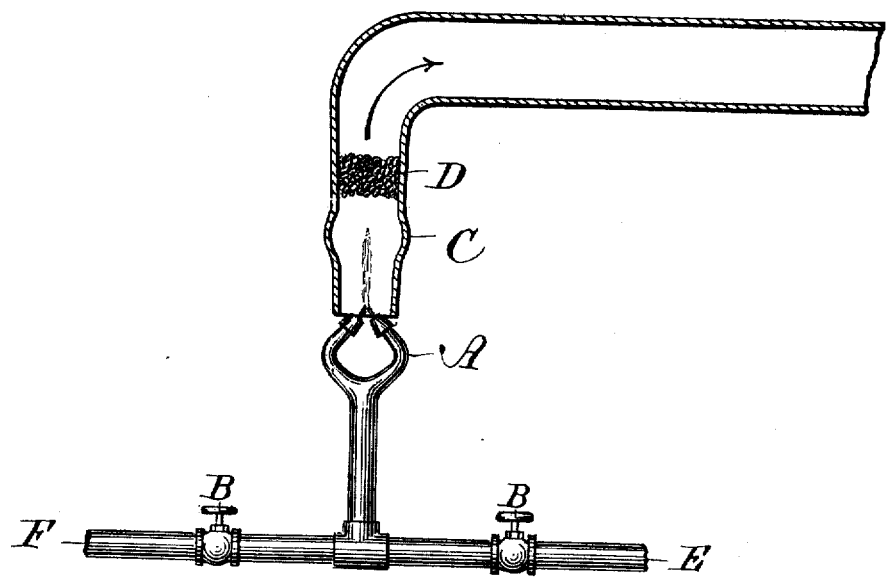
WITNESSES:
John O. Gempler
Edwin Seger
INVENTORS,
John W. Bailey,
Frank T. Bailey,
Mark Bailey,
BY Kenyon & Kenyon
ATTORNEYS

UNITED STATES PATENT OFFICE.

JOHN W. BAILEY, FRANK T. BAILEY, AND MARK BAILEY, OF JERSEY CITY, NEW JERSEY, ASSIGNORS, BY MESNE ASSIGNMENTS, TO UNITED LEAD COMPANY, A CORPORATION OF NEW JERSEY.

APPARATUS FOR MANUFACTURING CORRODING-GAS.

No. 829,379. Specification of Letters Patent. Patented Aug. 28, 1906.

Application filed October 18, 1900. Serial No. 33,426.

*To all whom it may concern:*

Be it known that we, JOHN W. BAILEY, FRANK T. BAILEY, and MARK BAILEY, citizens of the United States, and residents of Jersey City, county of Hudson, and State of New Jersey, have invented a certain new and Improved Apparatus for Manufacturing Corroding-Gas, of which the following is a specification, reference being had to the accompanying drawing, forming a part hereof.

Our invention relates to an improved apparatus for manufacturing a corroding-gas particularly adapted for carrying out the process of making white lead by corrosion, and more particularly an apparatus adapted to be used in carrying out the process forming the subject-matter of another application of ours, Serial No. 33,424, filed simultaneously herewith.

The success of the process of making white lead by the corrosion of metallic lead depends very largely on the character of the corroding-gas which is employed. While carbonic-acid gas is the principal ingredient of the corroding-gas, it is by no means the only essential ingredient. Air and the products of the combustion of substances other than carbon, as the products of combustion of hydrogen or water-vapor, are important factors in the process of corrosion, and the proportions and conditions of these various elements have a material influence on the corroding action. On the other hand, all the corroding-gases heretofore used contain more or less impurities, which not only impair the corroding action, but which enter into and contaminate the product, its physical properties, as well as its color, being injuriously affected.

We have discovered by long and patient research and experiment that the mixture of gases produced by the combustion of acetylene gas in air or by the combustion of acetylene gas and some other hydrocarbon gas in air, when introduced into a corroding-chamber and brought into contact with lead in any suitable form in the presence of any suitable oxidizing agent, produces a white-lead product which is whiter and finer in quality than is the product produced by the gas derived from burning coke, charcoal, or limestone, or from rotting tanbark, or from any other process known to us. This improved product, moreover, is produced in much less time than is required to produce an equal quantity by any prior processes. The best results are obtained when the acetylene gas, or the mixture of acetylene gas and other hydrocarbon, is so burned as to produce complete combustion of all the elements in the gas or gases.

The object of our invention is to provide an apparatus for producing a corroding-gas adapted to be used in the process of making white lead, which gas as to the condition and proportions of its ingredients is more perfect than any of the corroding-gases heretofore employed and which at the same time contains less injurious impurities than are contained in the gases hitherto manufactured in connection with any process of making white lead.

Our invention consists in the novel parts, improvements, and combinations herein shown and described.

One embodiment of our invention is shown in the accompanying drawing, which consists of a side view, partly in section, of an apparatus constructed in accordance with our invention.

In the drawing, A is a gas-burner of suitable construction.

E is a supply-pipe for supplying acetylene gas.

F is a supply-pipe for supplying coal-gas or other hydrocarbon gas. These supply-pipes are provided with supply-valves B B for regulating the amount of each kind of gas to be supplied to the burner.

C is a chimney above or in which is provided a layer of pieces of brick or other refractory material D. These pieces of brick become heated by the passing of the products of combustion and cause all the unburned carbon atoms passing through them to be completely consumed.

The principal ingredients of the corroding-gas thus formed are carbon dioxid, water-vapor, free oxygen and nitrogen, the same being suitably heated and thoroughly commingled in the most advantageous proportions. The exact proportions of these various elements will vary somewhat with the variations in the proportions of the coal-gas and acetylene gas supplied to the burner. We have found that when a substantial proportion of acetylene gas is used the resulting products of combustion make a much better corroding-gas than any corroding-gas heretofore used in the manufacture of white lead. The products of combustion from the burner may be led to any suitable corroding-chamber and brought into contact with lead in any suitable form in the presence of any suitable oxidizing agent.

Our improved apparatus is simple in construction and is easily manipulated.

By regulating the valves B B the quantities of the two kinds of gas supplied to the burner can be properly proportioned and can be varied to suit the conditions.

What we claim as new, and desire to secure by Letters Patent, is—

In an apparatus for making corroding-gas, the combination of the supply-pipes E and F, the valves B, the burner A, the escape-pipe C for the products of combustion, and the layer D of pieces of incombustible material, substantially as described.

In testimony whereof we have signed our names to this specification in the presence of two subscribing witnesses.

JOHN W. BAILEY.
FRANK T. BAILEY.
MARK BAILEY.

Witnesses:
JOHN O. GEMPLER,
EDWIN SEGER.